March 30, 1954 — H. VERMETTE — 2,673,636
COLLAPSIBLE PIPE STAND
Filed May 13, 1949 — 2 Sheets-Sheet 1
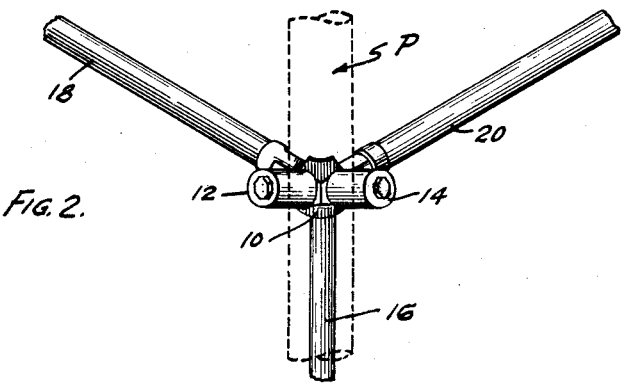
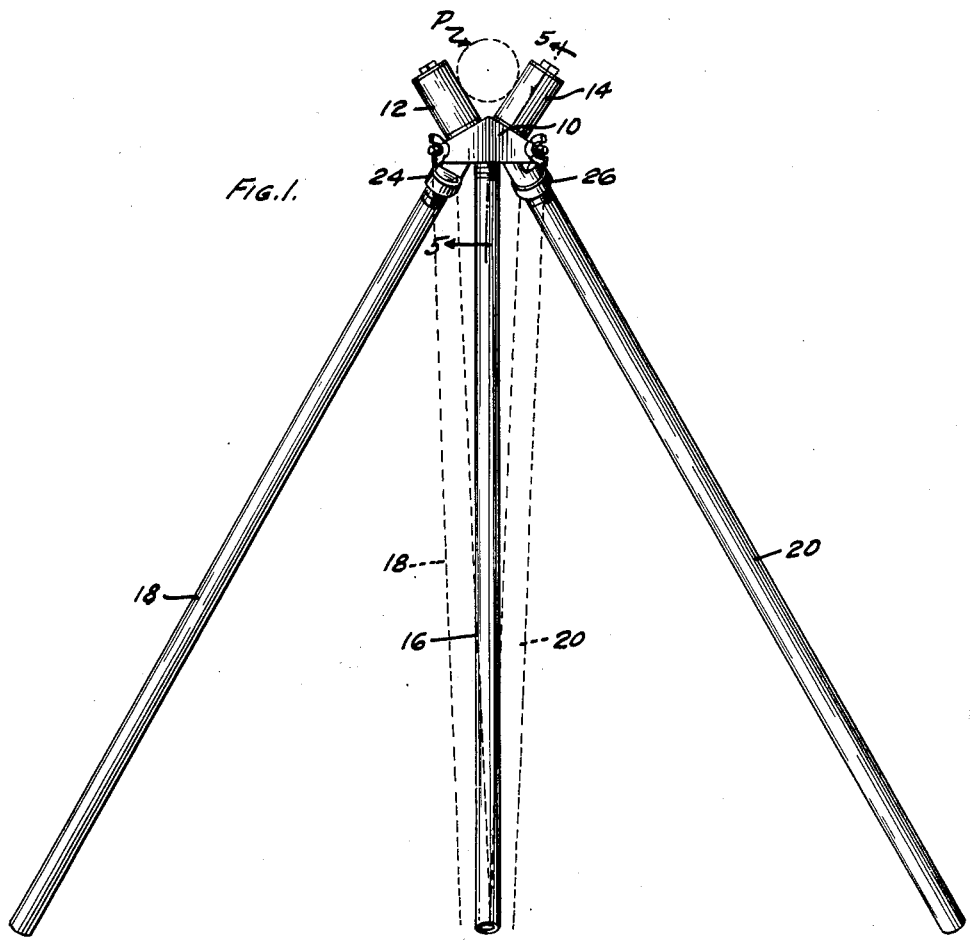
INVENTOR.
HOWARD VERMETTE
BY John B. Hosty
ATTORNEY.

March 30, 1954     H. VERMETTE     2,673,636
COLLAPSIBLE PIPE STAND
Filed May 13, 1949     2 Sheets-Sheet 2
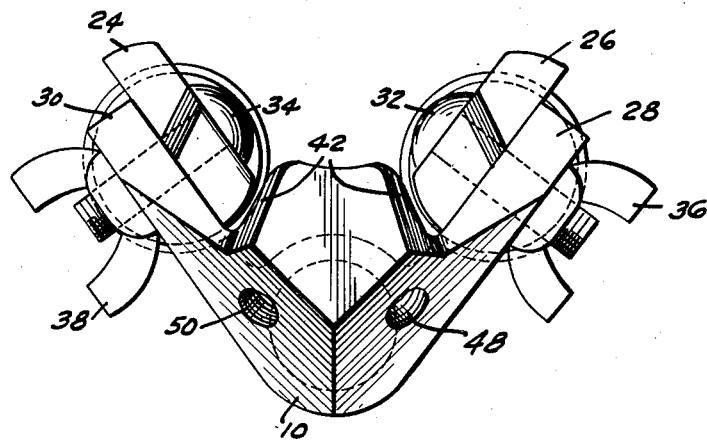
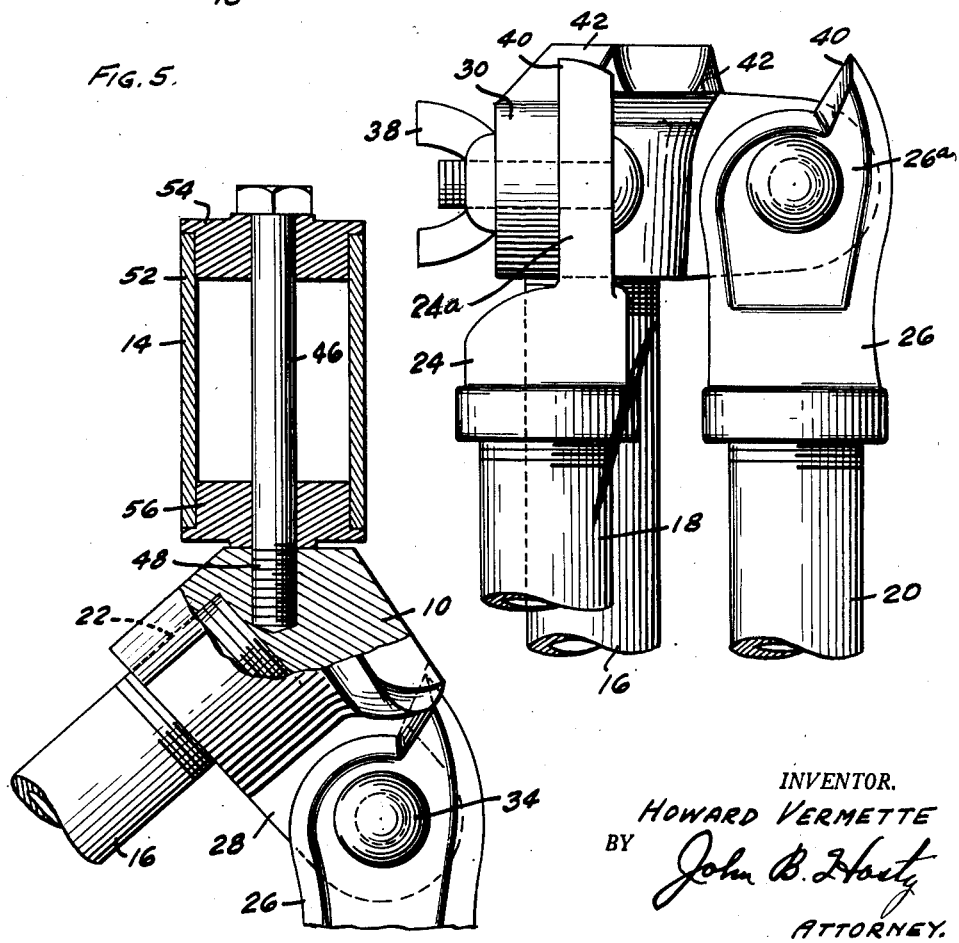
INVENTOR.
HOWARD VERMETTE
BY
ATTORNEY.

Patented Mar. 30, 1954

2,673,636

UNITED STATES PATENT OFFICE 2,673,636

COLLAPSIBLE PIPE STAND

Howard Vermette, Hammond, Ind.

Application May 13, 1949, Serial No. 93,101

1 Claim. (Cl. 193—42)

My invention relates to pipe stands and similar devices.

My invention relates more particularly to devices of the type described which may be used for supporting the extended ends of pipes, rods or similar articles which are being threaded, cut off or otherwise worked on by a pipe threading machine or other work unit.

In use, pipe stands of the type referred to must be comparatively rigid and sturdy as various lengths of pipe may weigh a considerable amount and thus require a solid and strong support. When not in use, as in carrying or transporting the same, it is desirable that the pipe stand be as light as possible and preferably collapsible so that a minimum of space is required for transportation and storage.

With these objectives in mind, I have provided a comparatively light and simple pipe stand capable of complete collapsibility so that it is easily carried about and easily set up.

A further object of the invention is to provide a collapsible pipe stand which in use forms a sturdy tripod support for the end of a pipe or other object, the pipe being positioned between rollers so that it can be moved back or forth in the pipe stand as it is being worked upon.

A further object of the invention is to provide a collapsible pipe stand of the type described constructed of a minimum of parts easily assembled or disassembled so that when any parts become broken it is a comparatively simple matter to replace them with a similar part.

A further object of the invention is to provide an improved collapsible pipe stand of the type described that collapses into a comparatively narrow long package, the three legs of the tripod construction being adapted to be folded together so that the device can be carried about in one hand if desired.

Other objects and advantages will be more apparent from the following description wherein reference is had to the accompanying drawings, upon which Fig. 1 is a front elevational view of the pipe stand set up for use, showing a pipe in dotted lines supported between the roller supports provided for this purpose;

Fig. 2 is a fragmentary plan view thereof;

Fig. 3 is a full size plan view of the stand bracket, the support rollers having been removed therefrom to more clearly show the elements which lie therebeneath;

Fig. 4 is a side elevational view of the same parts shown in Fig. 3 in a collapsed position as when the same is being carried about; and Fig. 5 is a fragmentary enlarged view taken on the lines 5—5 of Fig. 1 with parts broken in section to show the mounting for the support rollers.

In the embodiment of the invention which I have chosen to illustrate and describe, the collapsible pipe stand may generally include the stand bracket 10, a pair of angularly disposed support rollers 12 and 14 mounted thereon and tripod legs 16, 18 and 20. The leg 16 is screw-threadedly connected in a tapped opening 22 in the lower side of the bracket 10 and the legs 18 and 20 have pipe brackets 24 and 26 screw-threadedly attached to the upper ends of the same and are pivotally connected to ear portions 28 and 30 of the bracket 10 by means of bolt members 32 and 34. Wing nuts 36 and 38 are provided for quick attachment or detachment of the pipe brackets to the ears of the stand bracket.

The pipe brackets 24 and 26 which are similar in every detail have screw-threaded openings to receive the threaded ends of the legs 18 and 20 and flat upwardly projecting arm portions 24a and 26a through which the bolt members 32 and 34 extend. Each of the arm portions has an upwardly projecting pointed stop shoulder 40 which, in the angular position the stand assumes in operation, is adapted to have one wall of the pointed shoulder strike against an angular wall portion 42, one of which is on each side of the stand bracket 10 adjacent the ear portions 28 and 30.

A pipe such as the pipe P shown in dotted lines in Fig. 1 and Fig. 2 is adapted to be supported between the pair of angularly disposed rollers 12 and 14, the same being mounted upon bolt members 46 which are screw-threadedly mounted in the tapped openings 48 and 50 in the bracket 10. The rollers are preferably formed with the tubular shells 52 made of hardened steel and having the bronze cap members 54 and 56 at their ends so that a good bearing is provided on the shank of the bolt members. In use, a pipe may be cut off, threaded, cut off and moved forward again. Thus it is desirable to have the support in the shape of rollers so that the pipe is easily moved in the stand in spite of its weight.

As shown in Fig. 1, when the pipe stand is not in use, the tripod leg construction may be collapsed with the legs 18 and 20 in the dotted line position shown in Fig. 1, and the pipe stand thus takes up a very small amount of space on a truck for transportation or in storage.

The height of the stand limited by the shoulders 40 may be raised within limits when lighter pipe is being handled by fastening the legs at an angle by the wing nuts 36 and 38 on the bolt members 32 and 34.

The legs, pipe brackets and stand bracket are all preferably made of light aluminum, thus effecting in the entire ensemble a comparatively lightweight article, yet sufficiently strong and rigid so that it can be used extensively and for the support of comparatively heavy pipes without becoming broken or out of order.

While I have illustrated and described a specific embodiment of the invention, it will be apparent to those skilled in the art that changes and modifications may be made in the exact details shown, and I do not wish to be limited in any particular; rather what I desire to secure and protect by Letters Patent of the United States is:

A tripod stand including a generally triangularly shaped bracket having a flat bottom wall and sloping walls directed upwardly at the same angle to a peak medially of said bracket, a bolt fastened at right angles to the face of each of said walls, a support roller mounted on each bolt, said bracket having an angularly disposed tapped opening in its bottom wall, a pipe member screw-threadedly mounted in said tapped opening, a pair of ear members on said bracket forming extensions of said sloping walls, a pair of leg members, each leg member having a flat arm portion pivotally connected to one of said ear portions, and cooperating means between said bracket and said arm portions for limiting the pivotal movement of said leg members, said means including upwardly projecting stop shoulders on each of said arm portions and angularly disposed wall portions on said bracket adjacent each of said ear members adapted in operative position to make line contact throughout the length of said stop shoulders.

HOWARD VERMETTE.

References Cited in the file of this patent
UNITED STATES PATENTS

| Number | Name | Date |
|---|---|---|
| 606,616 | Young | June 28, 1898 |
| 764,491 | Newlove | July 5, 1904 |
| 769,447 | McKinney | Sept. 4, 1904 |
| 795,987 | Kremkav | Aug. 1, 1905 |
| 1,128,625 | Poulnot | Feb. 16, 1915 |
| 1,897,449 | Trowbridge | Feb. 14, 1933 |
| 2,408,247 | Wekeman | Sept. 24, 1946 |